Nov. 2, 1954  H. W. MARTIN ET AL  2,693,522
CAP HEATING APPARATUS
Filed Feb. 5, 1953  2 Sheets-Sheet 1
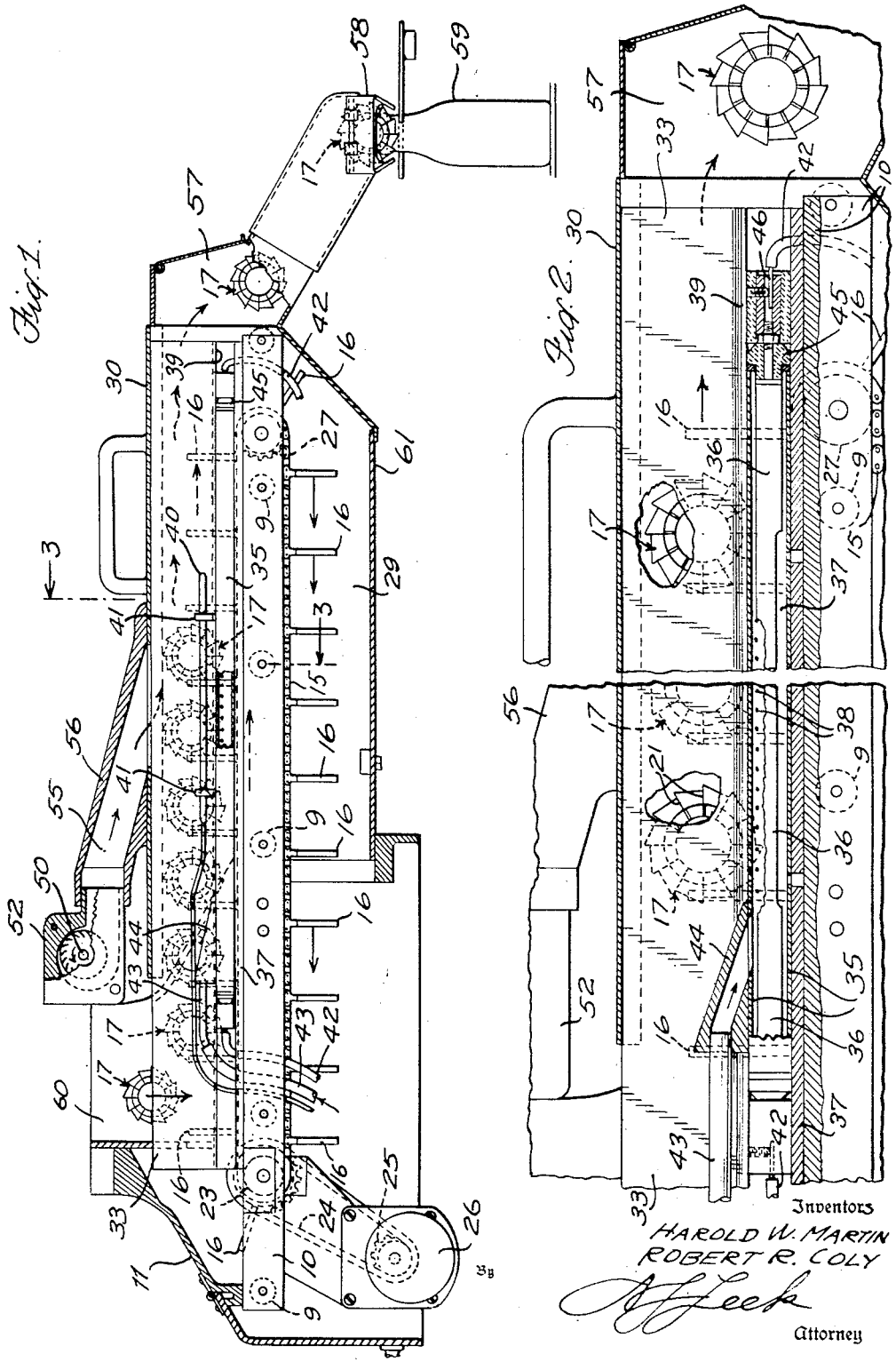
Inventors
HAROLD W. MARTIN
ROBERT R. COLY
Attorney Nov. 2, 1954     H. W. MARTIN ET AL     2,693,522
CAP HEATING APPARATUS
Filed Feb. 5, 1953     2 Sheets-Sheet 2
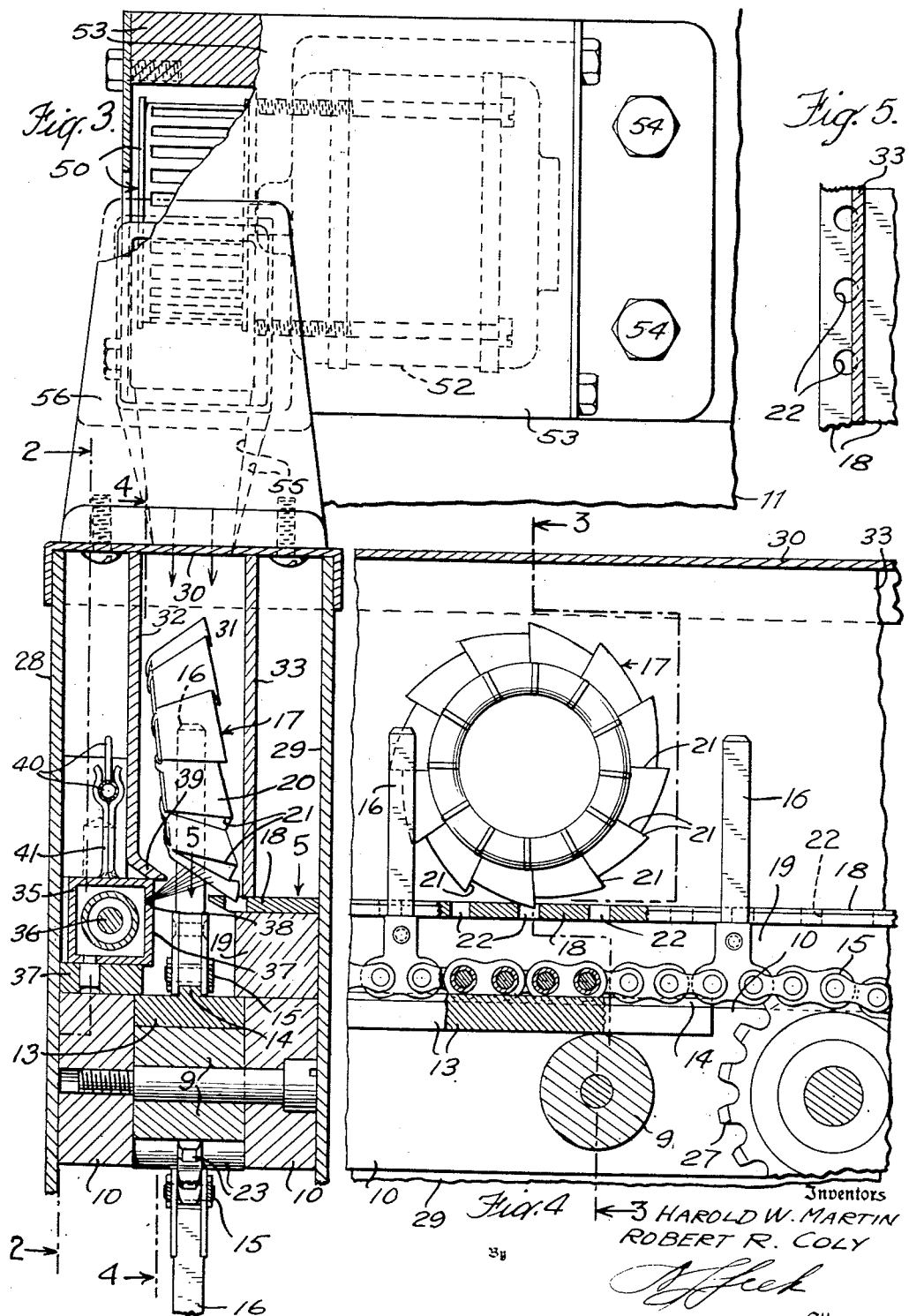
Inventors
HAROLD W. MARTIN
ROBERT R. COLY
Attorney Patented Nov. 2, 1954

2,693,522

CAP HEATING APPARATUS

Harold W. Martin, Malverne, and Robert R. Coly, Valley Stream, N. Y., assignors to American Seal-Kap Corporation of Delaware, Wilmington, Del., a corporation of Delaware Application February 5, 1953, Serial No. 335,288

5 Claims. (Cl. 219—34)

This invention relates to a machine and method for applying partially preformed, flexible skirted, hood caps to milk bottles or the like and more particularly to a mechanism for heating caps of the above type having a pleated skirt coated in whole or in part with a thermoplastic adhesive which becomes tacky when heated.

An object of the invention is to provide a mechanism of the above type having new and improved features of operation and details of construction.

Another object is to provide a mechanism of the above type having novel and improved means for heating the thermoplastic coating to condition the same for sealing.

Another object is to provide a mechanism of the above type which is adapted to supply heat uniformly to the thermoplastic adhesive around the entire periphery of the cap.

Various other objects and advantages will be apparent as the nature of the invention is more fully disclosed.

In a specific embodiment the invention is applied to a machine of the general type shown in the Goodwin et al. Patent No. 2,325,163 dated July 27, 1943, for Capping Machines. This patent discloses a machine which picks the caps successively from a cap magazine, feeds the caps along a chute where heat is applied to the thermoplastic adhesive thereon and delivers the caps, with the adhesive tacky for sealing, to a capping station wherein they are applied to the tops of a succession of milk bottles.

The present invention provides a novel and improved heating chute for use in machines of the above type which is capable of receiving the succession of caps from the picker, advancing the caps along the chute while being heated and delivering the same to the capping station in heated condition.

In accordance with the present invention the chute is provided with means for projecting against the cap skirt a current of air heated to a temperature suited to soften the thermoplastic adhesive. The current of air is introduced into the chute transversely at a plurality of points spaced along the chute and arranged to direct heated air against the lower portion of the cap skirt as the cap rolls along the chute. Means is also provided for imparting a positive rolling motion to the cap as it is advanced along the chute so that the entire periphery of the cap skirt is heated uniformly.

The nature of the invention will be better understood by referring to the following description, taken in connection with the drawings in which a specific embodiment thereof has been set forth for purposes of illustration.

In the drawings:

Fig. 1 is a side elevation of a heating chute embodying the present invention, with parts broken away to show the construction thereof;

Fig. 2 is a partial longitudinal section through the heating chute taken on the line 2—2 of Fig. 3, but on a reduced scale;

Fig. 3 is a transverse section through the chute taken on the line 3—3 of Fig. 1 but on a larger scale and also taken on the line 3—3 of Fig. 4;

Fig. 4 is a partial section taken on the line 4—4 of Fig. 3; and

Fig. 5 is a partial section taken on the line 5—5 of Fig. 3 showing details of the track on which the caps roll.

Referring to the drawings more in detail, a pair of bars 10 are carried by a housing 11 on suitable supporting means not shown and project laterally therefrom. The bars 10 are spaced apart by spacers 9 and carry therebetween a track 13 (Fig. 3) having a longitudinal flange 14 on which a conveyor chain 15 rides. The conveyor chain 15 carries a series of pins 16 which are adapted to advance caps 17 along a track plate 18 resting on a block 19 which is attached to one of the bars 10.

The caps 17 are formed with a pleated skirt 20 carrying on its outer surface a thermoplastic adhesive and having a series of folds 21. The track plate 18 is provided with a series of holes or depressions 22 which are spaced to conform to the space between the folds 21 and provide in effect a rack on which the caps rolls with the folds 21 entering the successive holes 22 to prevent the cap from sliding instead of rolling along its track.

The chain 15 is driven by a sprocket 23 which is mounted between the bars 10 and is driven by a belt or chain 24 from a sprocket 25 which is driven by a motor 26 through suitable reducing gears (not shown). At its far end the chain passes around an idler sprocket 27 which is also supported by the bars 10.

The chute is closed by a front plate 28 and back plate 29 which are attached to the bars 10 by a top plate 30. A cap heating compartment 31 is formed by plates 32 and 33 which are spaced from the top plate 28 and back plate 29 respectively. The plate 33 terminates at its lower end over the track plate 18 and over the edges of the series of holes 22.

An air heating chamber is formed by a duct 35 shown as rectangular in cross section and carrying internally thereof an electrical heating unit 36 which is shown as a standard Calrod unit. The duct 35 is mounted by means of a block 37 on a bar 10 adjacent the front plate 28. The plate 32 terminates at its lower end at the upper surface of the duct 35. The inner wall 37 of the duct 35 is provided with a row of holes 38 which are inclined in an upward direction as shown in Fig. 3, and are adapted to direct jets of heated air onto the cap skirt. The holes are so spaced along the chute that the jets overlap and provide a continuous stream of heated air which strikes the cap skirt as they roll along the track 18. The lower part of the plate 32 has an inclined flange 39, which assists in positioning the caps properly on the track 18.

A thermostatic element such as a bulb 40 is mounted in clips 41 in the space between the front plate 28 and the plate 32 and is connected to control the energization of the heating unit 36 so as to maintain the cap compartment at the proper temperature. The clips 41 are shown as mounted on the top of the duct 35. Electrical connections are made to the heating unit 36 by leads 42 (Fig. 1) and air is supplied to the duct 35 by means of an air pipe 43 and a duct 44 communicating through the top wall of the duct 35 to cause air to flow around the heating unit and out through the holes 38.

Referring to Fig. 2 the end of the heating unit 36 is mounted in a support of refractory material 45 through which an electrical connector 16 extends. The unit is of standard construction and only so much thereof is shown as is necessary to an understanding of the present invention. It is to be understood that any standard type of electrical heating unit may be disposed within the air tube 35.

An air blower 50 driven by a motor 52 is mounted in a housing 53 attached to the frame of the machine by bolts 54. The air blower 51 discharges air into a duct 55 formed by a housing 56 which communicates through the top plate 30 with the interior of the cap compartment 31 and is directed to cause a current of air to flow through the compartment 31 toward the exit end thereof so as to maintain the entire chute warm and to prevent stratification of the air. The chute discharges into a vertical chute 57 terminating at a cap applying station including a hinged door 58 in which the caps rest until they are picked off in the manner well known in the art by the advancing bottles 59. The chute is closed at the bottom by a drip pan 66. The caps are dropped by a picker mechanism not shown through a vertical chute 60 onto the track plate 18.

In the operation of this device the pins 16 are continuously advanced by means of chain 15 which is driven by the motor 26. Caps 17 are dropped in succession onto the track 18 in a position such that the edges of the cap skirts rest upon the track plate 18 with the folds 21 entering the holes 22 in the track plate so that the caps are forced to roll as they are pushed along by the advancing pins 16. As the caps roll along the track 18 jets of heated air from holes 38 in the heating duct 35 impinge on the cap skirts and particularly on the portions of the cap skirts adjacent the edge to be sealed. The holes 38 are spaced closely along the duct 35 so that the cap in effect contacts a continuous stream of heated air as it rolls along the chute. The temperature of the air, which is controlled by the heating unit 36, is so adjusted with respect to the average time of contact with the cap skirt that the thermoplastic adhesive on the cap skirt is heated to a softening temperature so it is rendered tacky and in condition for sealing. As the caps are discharged to the capping station 56 the adhesive is in a tacky condition so that when the cap is placed on the bottle and pressure applied a positive seal is obtained.

The current of air produced by the blower 52 maintains the cap compartment 31 warm and maintains the vertical chute 57 warm so that the cap is prevented from cooling while it remains at the capping station waiting to be applied to a bottle. The thermostatic unit 46 is so connected that the temperature in the cap compartment 31 is maintained within the limits necessary to produce the desired heating effect.

It is obvious that the details of construction may be varied and that the invention may be applied to various uses as will be apparent to a person skilled in the art.

What is claimed is:

1. In a machine for applying to containers partially preformed hood caps having foldable pleated skirts carrying a thermoplastic adhesive coating for securing the folds together, mechanism delivering said caps to container heads with the thermoplastic adhesive rendered tacky for sealing, said mechanism comprising a feed chute having a track along which said caps are adapted to roll, means advancing said caps along said track, and means including a hot air duct along said chute adjacent said track and having a plurality of openings spaced therealong to project a series of jets of heated air onto the cap skirts as they roll along said track.

2. In a machine for applying to containers partially preformed hood caps having foldable pleated skirts carrying a thermoplastic adhesive coating for securing the folds together, mechanism delivering said caps to container heads with the thermoplastic adhesive rendered tacky for sealing, said mechanism comprising a feed chute having a track along which said caps are adapted to roll, means advancing said caps along said track, means including a hot air duct along said chute adjacent said track and having a plurality of openings spaced therealong to project a series of jets of heated air onto the cap skirts as they roll along said track, an electrical heating unit within said air duct and disposed concentrically thereof to provide an annular air space within said duct and around said unit for the heating of said air, means supplying air for heating to said duct, walls forming a substantially closed elongated cap compartment in which said caps roll, blower means introducing air into said compartment in a direction to cause longitudinal flow of air therein, thermostatic means disposed adjacent said compartment and connected to control the temperature of the heated air supplied to said cap skirts, said track having a series of depressions conforming in spacing to the folds of said cap skirts and engaging said folds to insure the rolling of said caps along said chute.

3. In a machine for applying to containers partially preformed hood caps having foldable pleated skirts carrying a thermoplastic adhesive coating for securing the folds together, mechanism delivering said caps to container heads with the thermoplastic adhesive rendered tacky for sealing, said mechanism comprising a feed chute having a track along which said caps are adapted to roll, means including a hot air duct along said chute adjacent said track and having a plurality of openings spaced therealong to project a series of jets of heated air onto the cap skirts as they roll along said track, an electrical heating unit within said air duct and disposed concentrically thereof to provide an annular air space within said duct and around said unit for the heating of said air, means supplying air for heating to said duct, walls forming a substantially closed elongated cap compartment in which said caps roll, blower means introducing air into said compartment in a direction to cause longitudinal flow of air therein, thermostatic means disposed adjacent said compartment and connected to control the temperature of the heated air supplied to said cap skirts, said track having a series of depressions conforming in spacing to the folds of said cap skirts and engaging said folds to insure the rolling of said caps along said chute, and a conveyor chain having pins projecting into said chute and forming pockets therebetween to receive said caps and adapted to advance said caps along said chute.

4. In a machine for applying to containers partially preformed hood caps having foldable pleated skirts carrying a thermoplastic adhesive coating for securing the folds together, mechanism delivering said caps to container heads with the thermoplastic adhesive rendered tacky for sealing, said mechanism comprising a feed chute having a track along which said caps are adapted to roll, thermostatic means disposed adjacent said chute and connected to control the temperature of the heated air supplied to said cap skirts, said track having a series of depressions conforming in spacing to the folds of said cap skirts and engaging said folds to insure the rolling of said caps along said chute, and a conveyor chain having pins projecting into said chute and forming pockets therebetween to receive said caps and adapted to advance said caps along said chute.

5. In a machine for applying to containers partially preformed hood caps having foldable pleated skirts carrying a thermoplastic adhesive coating for securing the folds together, mechanism delivering said caps to container heads with the thermoplastic adhesive rendered tacky for sealing, said mechanism comprising a feed chute having a track along which said caps are adapted to roll, said track having a series of depressions conforming in spacing to the folds of said cap skirts and engaging said folds to insure the rolling of said caps along said chute.

References Cited in the file of this patent

UNITED STATES PATENTS

| Number | Name | Date |
|---|---|---|
| 2,325,163 | Goodwin | July 27, 1943 |
| 2,347,407 | Goodwin | Apr. 25, 1944 |
| 2,527,013 | Kjelgaard | Oct. 24, 1950 |